Figure 1:
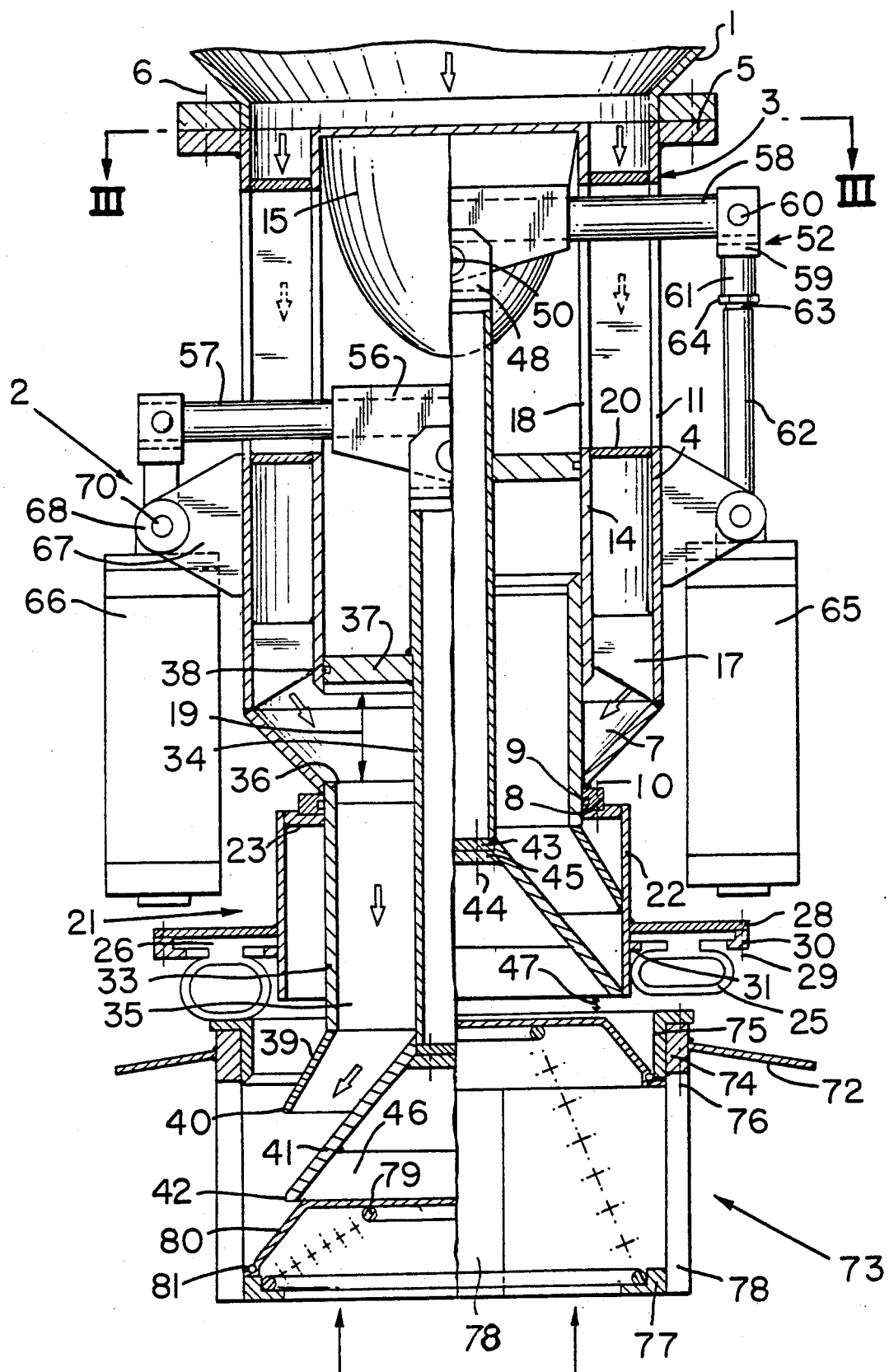

United States Patent [19]
Ebert et al.

[11] Patent Number: 5,118,242
[45] Date of Patent: Jun. 2, 1992

[54] LOADING SYSTEM

[75] Inventors: Helmut Ebert, Roedermark; Edmund Heschek, Offenbach, both of Fed. Rep. of Germany

[73] Assignee: Innoplan-Ingenieurgesellschaft Braas und Co. mbH, Frankfurt am Main, Fed. Rep. of Germany

[21] Appl. No.: 563,931

[22] Filed: Aug. 6, 1990

Related U.S. Application Data

[63] Continuation of Ser. No. 418,814, Oct. 4, 1989, abandoned, which is a continuation of Ser. No. 214,492, Jul. 1, 1988, abandoned.

[30] Foreign Application Priority Data

Jul. 1, 1987 [DE] Fed. Rep. of Germany ....... 3721672

[51] Int. Cl.⁵ .............................................. B65G 65/00
[52] U.S. Cl. ..................... 414/397; 414/202; 414/293; 414/291; 141/287; 141/388
[58] Field of Search ............. 414/212, 216, 291, 397, 414/141.8, 292, 287, 293, 185, 164, 200, 201, 202; 141/290, 287, 390, 391, 387, 388, 299; 193/3, 15, 30, 34, 25 C, 2 R; 222/504, 509, 549

[56] References Cited

U.S. PATENT DOCUMENTS

| | | | |
|---|---|---|---|
| 647,826 | 4/1900 | Guillaume | 414/200 |
| 2,599,334 | 6/1952 | Latham, Jr. | 414/202 |
| 3,180,502 | 4/1965 | Clark | 414/201 |
| 3,689,047 | 9/1972 | Grosko | 141/287 X |
| 3,985,245 | 10/1976 | Schulte | 141/388 X |

FOREIGN PATENT DOCUMENTS

| | | | |
|---|---|---|---|
| 570870 | 9/1958 | Belgium | 414/201 |
| 1984078 | 4/1968 | Fed. Rep. of Germany . | |
| 7033250 | 6/1971 | Fed. Rep. of Germany . | |
| 2249404 | 4/1973 | Fed. Rep. of Germany . | |
| 2441287 | 3/1975 | Fed. Rep. of Germany | 414/411 |
| 2657637 | 7/1978 | Fed. Rep. of Germany . | |
| 2821210 | 11/1979 | Fed. Rep. of Germany . | |
| 3049473 | 7/1982 | Fed. Rep. of Germany . | |
| 2562525 | 10/1985 | France | 414/291 |
| 239577 | 10/1986 | German Democratic Rep. | 414/291 |
| 903644 | 2/1982 | U.S.S.R. | 414/293 |

OTHER PUBLICATIONS

Buhler-Miag, Drawing, QKFQ Senderventil, Jul. 1979.

Primary Examiner—Frank E. Werner
Attorney, Agent, or Firm—Toren, McGeady & Associates

[57] ABSTRACT

In a loading system for containers, tank vehicles, or other containers that can be flange-mounted to the discharge hopper of a silo, with a tube slide, the inner casing of a double-walled dump pipe that is secured to the discharge hopper is used as a guide for this tube slide. The loading system is arranged beneath this discharge hopper. Apart from the closed position and the dump position, the tube slide can also be locked in a flushing position by means of an operating system. The lower end of the tube slide is configured as an opener for a closing plate of the filler opening of the container or the like that can be closed by the action of a spring.

24 Claims, 4 Drawing Sheets

LOADING SYSTEM

This is a continuation of Ser. No. 07/418,814, filed Oct. 4, 1989, now abandoned, which in turn is a continuation application of Ser. No. 07/214,492, filed Jul. 1, 1988, now abandoned.

The present invention relates to a loading system for containers, tank vehicles, or other containers; this system can be flange-mounted to the discharge hopper of a silo or the like, and incorporates a tube-slide unit that can be locked by an operating system within a guide in a closed position that shuts off the flow of material and in a dump position which releases the flow of material.

Apart from being used to load silos or the like with bulk material, loading systems are also used to complete various other tasks.

In one known case, for example, a loading head is used that consists of a vertically arranged telescoping filler pipe that has a stop ball at its lower outlet opening and which is suspended on a lifting and operating cable and a loading cone which, in the closed state, surrounds both the lower part of the telescoping filler pipe and also the closing cone, and which can be inserted into the filler opening of the silo or of a silo vehicle (DE-GM 70 33 250).

The traction cable or chain is secured to the tip of the closing cone. When this traction cable or the traction chain is lowered not only is the closing ball removed from the lower opening of the telescoping pipe, but the whole arrangement, which includes not only the telescoping pipe and the loading cone but also the suction pipe and a folding bellows, which is mounted on the casing surface of the closing ball, are lowered until the loading cone that has been inserted into the filler opening of a silo or a silo vehicle rests on the edge of the filler opening. Then the closing cone leaves its closed position in the end of the telescoping pipe and thus opens the path for the bulk material.

This loading head can easily result in imprecise loading if the spring travel of the silo vehicle becomes smaller as a result of the load and as a result of this the loading head that is located in the filler opening drops, whereas the position of the closing cone remains unchanged. In order to prevent this leading to greater quantities of bulk material being fed into the silo than is desired, it is necessary to use a visual indicator, with the help of which the overall position of the closing ball can be seen and adjusted.

Also known is a loading fitting with an internal telescoping tube and an upper central centering pipe that is enclosed concentrically by the individual telescoping pipes when the interior telescoping pipe has been collapsed. This loading fitting is a part of a bulk goods delivery system to which the bulk material is passed from a silo and can then be moved longways along a straight stretch. The bulk material is moved into the transportation container of a motor vehicle by the loading fitting. In order that, using such a loading fitting, and when the loading fitting is sufficiently rigid, it can be moved transversely to the direction of travel at the same time that it is moving in the direction of travel, there is at the lower end of the centering pipe a carrier ring that is concentric with the centering pipe and which is installed so as to be able to pivot about an axis that extends in the direction of travel of the loading fitting; the inner telescoping pipe rests on the outwardly extending arms of this carrier ring when it is in the extended position (DE-PS 28 21 210).

This loading fitting consists of numerous individual parts, all of which are subjected to wear and which function in conjunction with loading fittings which travel along a (set) path.

Where this is not necessary but where bucket cars or container vehicles that can be driven to a precise location are to be filled, for example, with dusty bulk material, from bunkers it is possible to use a system, the essential features of which are that there is a plurality of outlets arranged on the bunker, the number and arrangement of the filler connectors of which correspond to those of the vehicle that is to be loaded, each such filler connector being provided with a shutoff device and with a telescoping pipe and is fitted at the lower end with a plate that covers the filler connector of the vehicle. A further important feature of this system is that the plate at the lower end of the telescoping pipe can be adjusted for height and has a spherically moveable pressure seating; the telescoping pipe is double-walled, and the annular space between the two walls of this telescoping pipe are connected by an air line to the free space within the bunker, above the bulk material. A shutoff element is included in this air line and this is so connected to the shutoff for the bunker that it is opened and closed simultaneously with this In addition, the telescoping pipe is connected with the pistons of two compressed air cylinders and a compressed air cylinder is provided to operate the bunker shutoff device.

One important disadvantage in this is that each outlet from the bunker has to be opened and closed by means of a pneumatically operated shutoff device. This also requires an extremely costly control system. In addition, the filler connectors of the vehicle or the container also have to be opened before the loading process begins (DPS 838 720).

A simplification of loading systems of this kind that are used for containers, tank vehicles, or other containers, which can be positioned precisely beneath the bunker before being filled, can be achieved in that a so-called QKFQ sender valve (Buehler-Miag) is used; this has a pipe slide that can be locked by an operating system in one position that shuts off the flow of material and in a dump position that permits the bulk material to flow. The pipe slide is functionally connected with the piston rods of a pneumatically or hydraulically operated cylinder by which it can be slid into the lower end of a bunker discharge hopper. In its upper closed position the pipe slide closes the bunker outlet, whereas in its lower position it opens up an annular slot through which the bulk material can pass into the pipe slide, the lower end of which protrudes into the filler opening of the container that is to be loaded.

A disadvantage in this is that the operating cylinder is mounted within the discharge hopper. In the case of very fine dust the outflow from the discharge hopper is problematic. Fine dusts have a tendency to form bridges. In the case of the sender valve, this problematic position of the bunker outlet is additionally restricted by the operating cylinder. In addition to this, the air or hydraulic lines pass through the discharge hopper and have to be connected to the operating cylinders. This increases the danger that the dust-like bulk good can be contaminated by hydraulic oil or by the pneumatic medium. Furthermore, because of the arrangement of the working cylinders within the discharge hopper, the discharge cross section through the annular slot is relatively small. This means that the loading capacity cannot be increased beyond a relatively low level. A particular feature of the sender valve is also the fact that it can only operate in conjunction with a previously opened filling connector.

In contrast to this, it is the task of the present invention to create a loading system for containers, tank vehicles, and other containers of the type described in the introduction hereto, by means of which it is not only possible to increase the loading performance and avoid contamination of the dust-like bulk material, but which also makes it possible to achieve a relatively simple seal between the loading system and the filler connector. Furthermore, it is intended to create a loading system that permits a fully automatic loading procedure in which it is not necessary to open the filler connector of the container that is to be loaded prior to the commencement of the loading procedure.

Using the present invention, this problem can be solved in a particularly simple manner in that the loading system is arranged beneath the discharge hopper; in that the inner casing of a double-walled dump pipe is used as a guide for the tube slide; in that—apart from being locked in the closed position and in the dump position—the tube slide can also be locked in a flush position; and in that the lower end of the tube slide is configured as an opener for a closing plate on the inlet opening of the container, which can be closed by the action of a spring.

Because of the fact that the loading system is installed beneath the discharge hopper, it is easy to install and equally easy to remove. The lower area of the discharge hopper only needs to be configured as a connector flange to which the loading system according to the present invention has to be flange-mounted. A further advantage of this arrangement beneath the discharge hopper lies in the fact that the discharge procedure within the discharge hopper is not disrupted. Neither does the lower area of the discharge hopper need to be configured as a guide for the tube slide. The annular space within the double-walled dump pipe is used completely for the discharge of the material. The whole of the inner part of the double-walled dump pipe serves as a guide for the tube slide.

A further advantage compared to the prior art results from the fact that the tube slide can also be locked in a flush position by means of the operating system. In this flush position the supply of material from the bunker to the container is shut off although the flushing air or flushing gas within the container that is to be loaded can escape through the loading system.

A particular advantage is the fact that the lower end of the tube slide serves as an opener for the inlet opening of the container that is to be filled. This is achieved by means of a special configuration of this inlet opening that includes a closing plate that can be closed by the action of a spring. Normally, the closing plate is held in the closed position by the spring.

The dump channel of the loading system according to the present invention is formed by the annular space that extends between the outer casing and of the inner casing of the double-walled dump pipe. Its throughput cross section is defined by upper and lower standoff struts between the inner casing and the outer casing. Because of the configuration of the dump channel, telescoping pipes are no longer needed. The dump channel is of a fixed length beneath the discharge hopper and since the container that is to be loaded can be moved beneath the loading system, for example, on rails, and then stopped in the loading position, care has been taken to ensure that the distance between the double-walled dump pipe and the filler opening of the container remains constant even if the weight of the container is increased to the maximum because of the bulk material.

A dump hopper is adjacent to the outer casing of the double-walled dump pipe and the lower end of this hopper is of the same inside diameter as the inside casing of the double-walled dump pipe. The lower edge of the dump hopper is separated by the width of an annular gap from the lower edge of the inner casing of the double-walled dump pipe. This annular gap is closed when the tube slide is in its uppermost position and is open when the tube slide is in the lower dump position, so that the bulk material can pass from the dump channel through the interior of the tube slide into the filler opening of the container that is to be filled.

A flush chamber with a cylinder-shaped outer casing is flange-mounted onto the lower edge of the bulk material hopper through an outside flange. Around the outer casing there is a retaining ring for an inflatable annular seal. This sealing ring is large enough to effect a gas-tight seal between the loading system and the filler opening of the container, without there being any need for the loading system itself to be moved in an axial direction in order to achieve this.

The upper area of the inner casing of the double-walled dump pipe is closed so as to be dust-proof by means of a roof-like cover. The tube slide that slides on the inner casing of the double-walled dump pipe is secured to the operating tube by means of standoff struts, and above the tube slide there is a piston with an annular piston seal that slides in like manner on the inner casing. By means of a joint the upper end of the operating tube is flexibly connected through a cross-beam that passes through passage openings that are opposite each other in the double-walled dump tube in the inner and outer casings, to the piston rods of the cylinders. By operating this cylinder the tube slide can be moved up and down within the double-walled dump tube and locked in three positions, namely, the closed position, the dump position, and the flush position.

At the lower edge of the tube slide there is an outer truncated conical casing and at the end of the operating tube there is an inner truncated conical casing, the outer edges of which rest on the outer casing of the wash chamber. The bulk material passes into the interior of the container through this annular hopper when in the dump position.

In the lower area of the inner truncated conical casing there is at least one standoff strut which in the dump position and in the flush position of the loading system lies on the closing plate of the filler opening and opens this against the force of a spring.

Of particular importance is the fact that during the loading of the container the dump position of the loading system permits venting of the container through the filler opening, the wash chamber, and through an air vent.

It has been shown that the loading system according to the present invention is particularly advantageous if a plurality of containers is to be loaded automatically. The containers can be moved into position beneath the bunker on rails without any difficulty and then stopped. The correct position is transmitted to a central control position by feedback. The automatic loading of the containers by means of the loading system can be initiated by this feedback. First, a sealing ring is inflated by this, and this effects a dust-tight seal between the loading system and the filler opening of the container. This dust-tight seal also ensures that bulk material, frequently of a very sensitive nature, cannot come into contact with either moisture or oxygen in the atmosphere.

Once the sealing has been effected, the cylinders are activated, and these lower the tube slide without affecting the seal thereby. This means that the tube slide is lowered and this opens the filler opening of the container and also permits the material to flow through the tube slide and the annular cone. At the same time the container is vented through the flush chamber and the air vent pipe. Loading can be monitored by means of a scale that returns the loading system into its uppermost position in a timely manner before the nominal weight is reached; in this position, the flow of bulk material is stopped and the filler opening is once again closed. Next, the air is released from the annular seal, and the seal between the loading system and the filler opening is broken.

Figure 3:
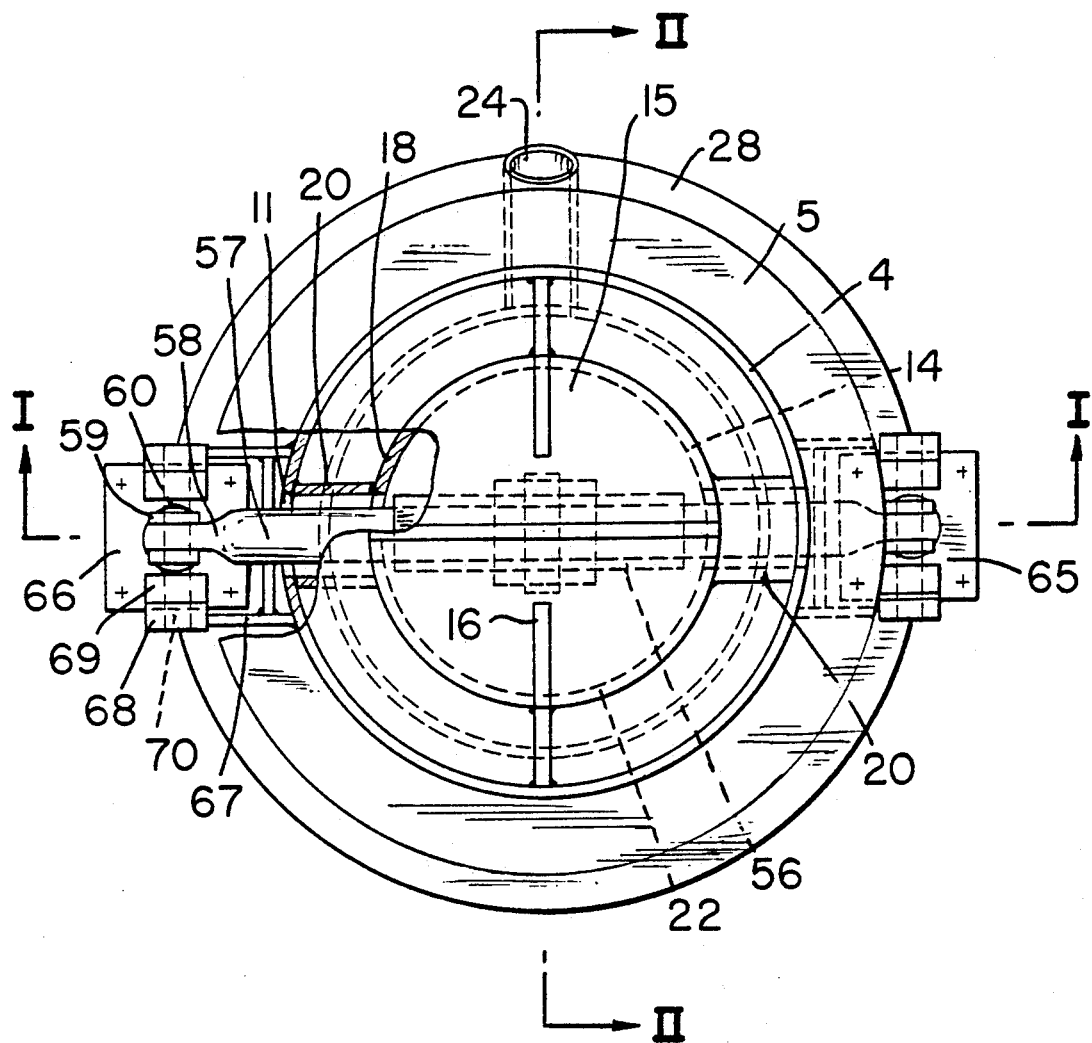

An embodiment of the invention will be described in greater detail below on the basis of the drawings appended hereto that show the following:

FIG. 1: a longitudinal cross-section through the loading system on line I—I in FIG. 3; the closed position is shown on the right-hand side, the dump position on the left-hand side.

Figure 2:
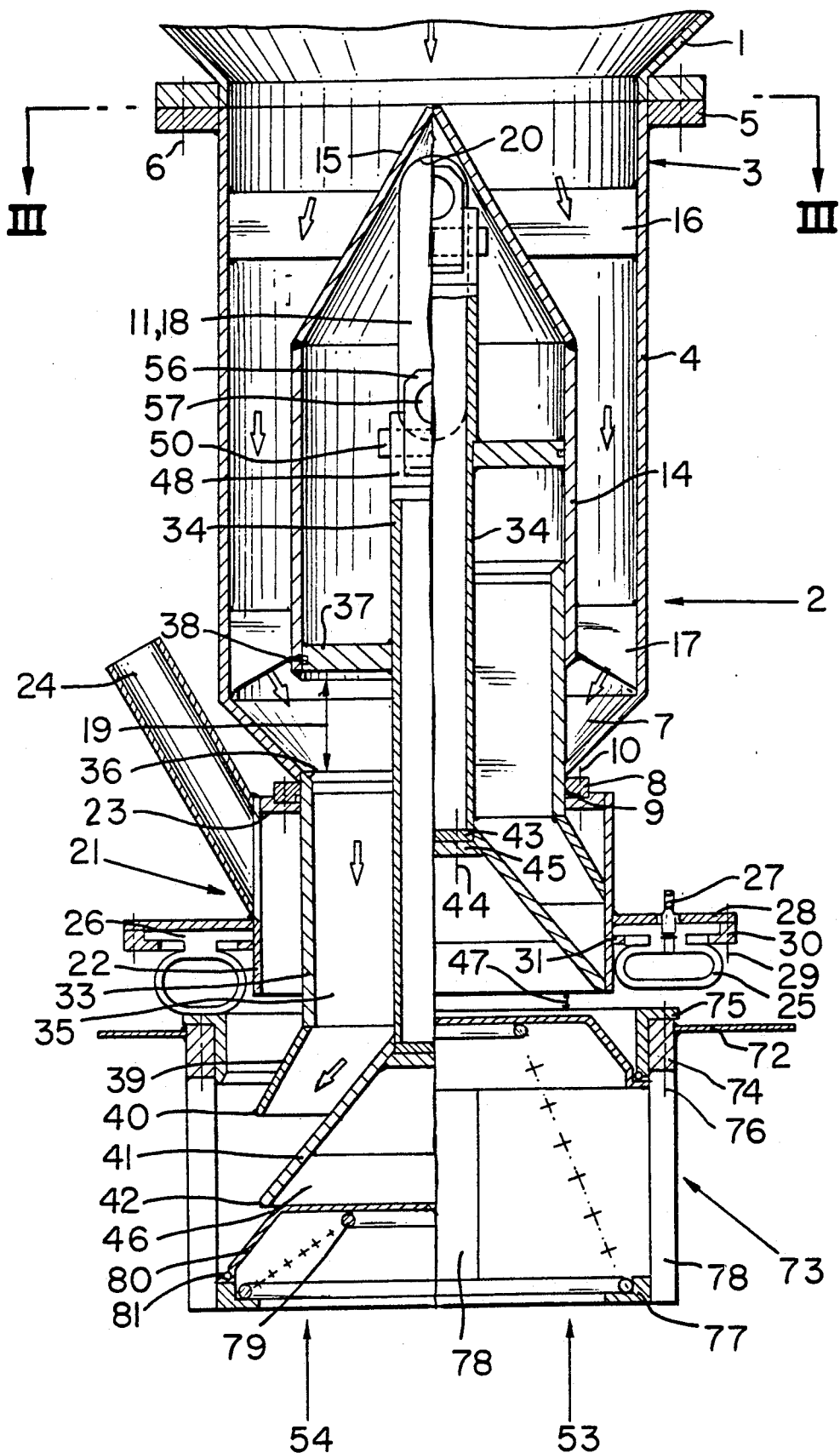

FIG. 2: a cross-section through the loading system on the line II—II in FIG. 3, the closed position being on the right-hand side, the dump position being on the left-hand side.

Figure 4:
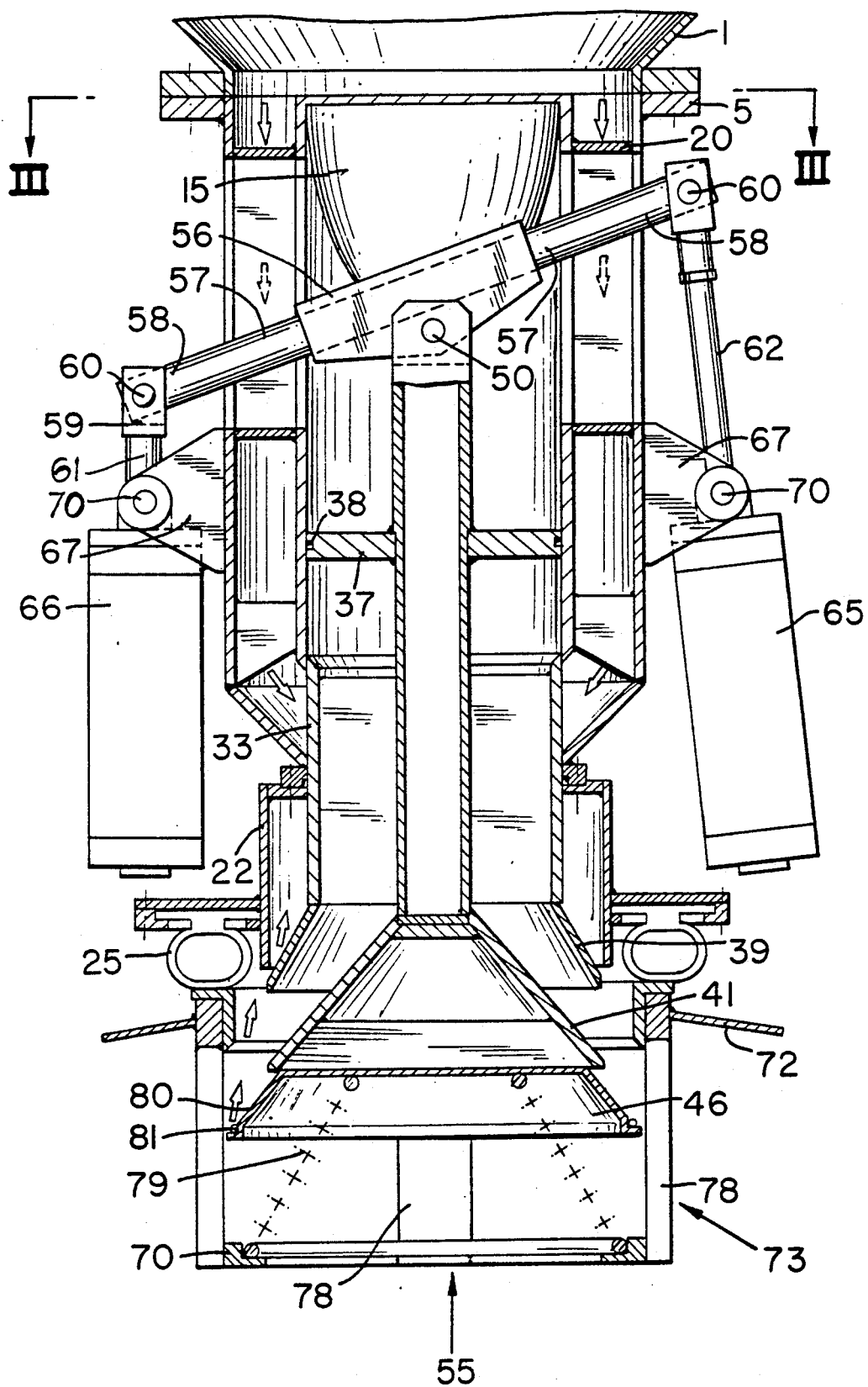

FIG. 3: a plan view of the loading system along the line III—III in FIGS. 1, 2, and 4.

FIG. 4: a longitudinal section through the loading system along the line I/I in FIG. 3, in the wash position of the loading system.

Beneath a discharge hopper 1 that is only indicated in FIG. 1 and which is located under a bunker there is a loading system that bears the overall reference number 2. In the embodiment shown there is an end flange (not shown herein) on the discharge hopper and this is connected by means of the screws 6 with an upper connector flange 5 of the loading system 2.

The loading system includes a double-walled dump pipe 3 with an outer casing 4 and an inner casing 14. The annular space between the outer casing 4 and the inner casing 14 is designated as the dump channel. The flow cross section of this dump channel of the double-walled dump pipe 3 is defined by upper and lower standoff struts 16 and 17 that are arranged between both of the casings. In the embodiment shown, as a comparison between FIG. 1 and FIG. 2 reveals, there are four upper standoff struts 16 and four lower standoff struts 17. The number of these standoff struts can be increased or reduced without changing the concept of the invention thereby. A dump hopper 7 is connected to the outer casing 4 of the double-walled dump pipe 3. Its lower edge is of the same diameter as the inner casing 14 of the double-walled dump pipe 3. The lower edge of the dump sphere is separated from the lower edge of the inner casing 14 by the width of an annular slot 19. The annular slot 19 can be widened or narrowed down depending on the inclination of the dump cone.

A lower connector flange 8 is welded around the lower edge of the dump sphere 7 and the inner casing of this makes a smooth transition to become the lower edge of the dump cone 7. A flush chamber 21 is flange-mounted onto the lower connecting flange by means of screws 10; this flush chamber 21 consists of a connector ring 23 and an outer casing 22. Their significance will be described in greater detail below.

FIG. 2 shows that an air-vent pipe 24 is connected to the flush chamber 21. A mounting 28 is arranged about the outer casing 22 of the flush chamber 21 and this is fitted with an inflatable sealing ring 25, one which can be emptied by means of a valve 27. In detail, the inflatable sealing ring has a retaining ring 26, the upper annular surface of which lies flat on the lower annular surface of the mounting 28. In order to permit a secure seat for the inflatable sealing ring 25, an inner retaining ring 31 is secured about the outer casing 22 of the flushing chamber 21 and an outside retaining ring 30 is bolted to the outer edge of the mounting 28. This means that the retaining ring 26 of the inflatable sealing ring is securely held. There is an opening for a valve 27 in the mounting ring 28. The inflatable sealing ring 25 can be inflated by means of a system (not shown herein) and can be emptied through the valve 27. The outer retaining ring 30 can be secured to the mounting 28 by other means than the screws 29.

FIGS. 1 and 2 show that by inflating the inflatable sealing ring 25 it is possible to produce a seal between the loading system 2 and the filler opening 73 of a container 72 that is located beneath this, without having to move the loading system 2 itself in an axial direction. Since the containers that are to be loaded stand on solid bases (not shown herein) the container will not become lower during the loading process. Thus, the seal produced by means of the inflatable sealing ring 25 will be maintained during the whole of the loading process and during the subsequent flushing process that is explained below.

FIG. 1 shows a roof-shaped cover 15 (in side view in FIG. 1, and in cross section in FIG. 2) that is installed on the upper area of the inner casing 14 of the double-walled dump pipe 3 and which provides a dust-type closure of the inside of the inner casing. The edge of the roof-shaped cover 15 lies in or beneath the plane of connection of the upper connecting flange 5 on the double-walled dump pipe 3. This means that, on the one hand, the interior space of the inner casing 14 is closed off so as to be dust tight, and, on the other hand, the dimensions of the loading system 2 are kept such that no part of the structure projects upwards so as to be disruptive.

A tube slide 33 which is functionally connected by means of the standoff struts 35 to a central operating tube 34, can slide within the inner casing 14. A comparison of FIG. 1 and FIG. 2 shows that in the embodiment shown there are four standoff struts 35. There is an annular seal 9 for the tube slide 33 within the lower sealing flange 8.

A piston 37 is secured above the tube slide 33 (in the embodiment shown, this is welded in place) and this is provided with an annular piston seal 38 and also slides along the inner casing 14. Reliable up and down movement of the tube slide within the inner casing is ensured by means of the tube slide 33 and the piston 37.

An outer truncated conical casing 39 is secured to the lower edge of the tube slide 33 and an inner truncated conical casing 41 is secured to the lower end of the operating tube 34. These two truncated conical casings form an annular dump cone beneath the tube slide, through which the material is distributed in a manner described hereinafter during the loading process. The outer edge of the two truncated conical casings 39 and 41 are formed as peripheral seals 40 and 42. As can be seen in the closed positions that are shown in the right-hand part of FIG. 1 and FIG. 2, they lie on the outer casing 22 of the flushing chamber. FIGS. 1 and 2 show that in this closed position the tube slide closes the annular slot at the height 19 and also shows that the annular dump cone is closed. This closed position is numbered 53.

In contrast to this, in the dump position 54 the edge that has the incline surface 37 lies on the lower edge of the dump hopper 7 and the outer truncated conical casing 39 and the inner truncated conical casing 41 protrude into the filler opening 73 of the container 72. In this dump position, as is shown by the arrows, the path is free from the bunker through the dump channel, the dump hopper 7, the tube slide 33 and through the annular gap formed by the truncated conical housings 39 and 41 into the interior of the container. In this position, as is shown in the left-hand portion of FIG. 2, the air can pass out of the container through the annular area of the flushing chamber 21 and through the air-vent pipe 24.

The outer truncated conical casing 39 is welded to the tube slide 33. The inner truncated conical casing 41, on the other hand, is welded to a connector plate 45 that is secured by means of the screws 44 to an end plate 43 of the operating tube 34.

There is at least one cross strut 46 in the lower area of the inner truncated conical casing 41 which, in the dump position 54 and in the flushing position 55 of the loading system 2 as shown in FIG. 4, lies against a closing plate 80 in the filler opening 73 and thus opens this closing plate against the force exerted by spring 79.

In particular, the edge of the filler opening 73 of the container is provided with a reinforcing ring 74 that supports a spring seat 77 by means of distance beams 78 that protrude into the container 72; this spring seat 77 accommodates the coil spring 79 for the closing plate 80.

In the embodiment shown the reinforcing ring 74 is combined with an insert 75 that is of L-cross section. The inner ring that protrudes into the interior of the container has a bevel against which an annular seal 81 at the lower end of the closing plate 80 lies when the filler opening 73 is in the closed position. The strength of the spring 79 is such as to ensure complete, reliable sealing of the container during transportation of the bulk material contained therein. This sealing is necessary to maintain an inert-gas atmosphere within the container (not shown in detail) or to protect bulk material contained in the container against moisture or atmospheric contamination.

In order that the closing plate 80 can carry out its function of providing a reliable seal it is configured as a truncated conical casing that tapers towards the top and is fitted with an upper cover. The casing surface of the truncated conical casing is inclined to the casing surface of the inner truncated conical casing 41 at the operating tube 34 so as to ensure reliable loading of the container. The insert 75 can be secured by means of screws 76 to the reinforcing ring 74 on the filler opening 73. In order to ensure a good seal by the inflatable sealing ring 25 the screw heads of the screws 76 are so configured as to ensure a smooth sealing surface on the upper ring on the insert 75.

Within the upper area of FIG. 1 and FIG. 4 there are passage openings 11 in the outer casing 4 and passage openings 18 within the inner casing 14 of the double-walled dump tube 3. These passage openings 11 and 18 are provided with casings 20 that effect a seal against the bulk material within the dump channel.

A cross beam 57 is secured to the upper end of the operating tube 34 by means of a forked head 48, a pin 50 and a cross-beam receptacle 57, the articulated end of this cross-beam 57 passing through the passage openings 11 and 18 that are located opposite each other in the double-walled dump tube 3. Articulated piston rods 62 of the cylinders 65 and 66 are connected to the articulated ends by means of forked heads that consist of a fork 59, a pin 60 and a threaded connector 61. The piston rods 62 are provided in a manner familiar per se with threaded ends 63 that are screwed into the threaded connectors 61 and then secured with lock nuts 64.

As can be seen mainly in FIG. 3, each cylinder 65, 66 is connected by means of lugs 68 and connector lugs 69 as well as by the pins 70 to the pivoting flange 67, which thus permits a pivoting connection of the cylinders 65 and 66 with the outer casing 4 of the double-walled dump tube 3. Together, the individual elements described above form the operating system that bears the number 52.

FIGS. 1 and 2 show that in the closed position 53 the piston rods 62 of both cylinders 65 and 66 are extended and the slide 33 is in its uppermost position.

In contrast to this, in the dump position 54 the piston rods 62 of the cylinders 66 and 65 are retracted, and the slide 33 is in its lower position.

In the flushing position 55 that is shown in FIG. 4 the piston rod 62 of the cylinder 66 is retracted and the piston rod of the cylinder 65 is extended into its uppermost position. Then, the cross-beam 57 takes up the inclined position shown in FIG. 4, and the cylinder 65 is pivoted about the pin 70. The inflatable seal ring 25 is inflated and seals the loading system 2 on the filler opening 73. As can be seen in FIG. 4, the slide 33 is locked in a position in which the annular slot 19 is closed, so that no material can flow from the bunker into the container 72. In contrast to this, the outermost truncated conical casing 39 has not yet been raised so that its annular seal 40 lies against the outer casing 22 of the wash chamber 21. Accordingly, gas or air can escape from the interior of the container 72 through the flushing chamber 21 and through the air-vent pipe 24. In this position, the cross strut presses the closing plate 80 downwards although, however, this is not yet open to the full extent.

We claim:

1. A system mounted beneath a discharge hopper of a silo, by way of flange, for loading bulk material from the discharge hopper into containers, comprising:
a tube slide lockable within a guide in a closed position that shuts off a flow of the bulk material from the discharge hopper, and in a dump position that permits the flow of bulk material; and operating system (52) for moving the tube slide into the closed and dump positions; a co-axially double-walled dump pipe (3) secured to the discharge hopper (1) and having an inner casing (14) and an outer casing (4) the inner casing being used as the guide for the tube slide (33), apart from the closed position (53) and the dump position (54), the tube slide (33) also being lockable in a flushing position

(55) by the operating system (52), in which flushing position the flow of bulk material is shut off while flushing gas is permitted to escape from a container being loaded; and opening means (41, 46) at a lower end of the tube slide (33) for opening a closing plate (80) of a filler opening (73) of the container (72) being loaded, which closing plate is closeable by a spring (79).

2. A loading system as defined in claim 1, wherein the double-walled dump pipe (3) has a dump channel with a throughput cross section defined by upper and lower standoff struts (16, 17) between the inner casing (14) and the outer casing (4).

3. A loading system as defined in claim 2, wherein at an upper end of the operating pipe (34), by means of a hinge (48, 50, 56), there is connected a cross beam (56, 57) which passes through passage openings (11, 18) that are opposite each other in the double-walled dump pipe (3) in the inner and outer casings (14, 4), the hinge having ends (58) which are connected flexibly (59, 60) to piston rods (62) of cylinders (65, 66).

4. A loading system as defined in claim 3, wherein the passage openings (11, 18) that are opposite each other in the outer casing (4) and the inner casing (14) are connected to each other through a sealed casing (20).

5. A loading system as defined in claim 3, wherein the cylinders (65, 66) are mounted flexibly on pivot flanges (67) that are secured to the outer casing (4) of the double-walled dump pipe (3).

6. A loading system as defined in claim 3, wherein in the flushing position (55) of the loading system (2), when the cross beam (57) is inclined, one of the cylinders (65 or 66) is in the closed position (53) and another is set in the dump position (54).

7. A loading system as defined in claim 1, wherein at as lower end of the outer casing (4) of the double-walled dump pipe (3) a dump hopper (7) is arranged having a lower edge which has an inside diameter equal to that of the inner casing (14) of the double-walled dump pipe (3), and a lower edge of which is separated by an annular gap (19).

8. A loading system as defined in claim 7, wherein the lower edge of the dump hopper (7) makes a smooth transition into an inner casing of a lower connector flange (8) that is secured to the hopper, to which a flushing chamber (21) is mounted by a flange.

9. A loading system in claim 8, wherein the flushing chamber (21) includes a connector ring (23) that is secured to the lower connecting flange (8) and a cylinder-shaped outer casing (22).

10. A loading system as defined in claim 9, wherein about the outer casing (22) of the flushing chamber (21) there is retaining ring (28) for an inflatable sealing ring (25) that can be deflated through a valve (27), which ring (25) in an inflated state seals the loading system (2) against the filler opening (73) of the container (72).

11. A loading system as defined in claim 10, wherein the inflatable sealing ring (25) is provided with a retaining ring (26) that can be secured by an outer retaining ring (30) and an inner retaining ring (31) on the mounting ring (28).

12. A loading system as defined in claim 9, wherein the tube slide (33) slides on the inner casing (14) of the double-walled dump pipe (3) and is secured by means of a standoff strut (35) to a coaxial operating tube (34), on which, above the tube slide (33), is secured a piston (37) that also slides on the inner casing (14.)

13. A loading system as defined in claim 12, wherein the piston (37) is provided with an annular piston seal (38).

14. A loading system as defined in claim 12, wherein on a lower edge of the tube slide (33) there is an outer truncated conical casing (39) and at an end of the operating pipe (34) there is an inner truncated conical casing (41), said conical casings (39, 41) having outer edges which are formed as peripheral seals (40, 42) and which in the closed position (53) of the loading system (2) lie on the outer casing (22) of the flushing chamber (21).

15. A loading system as defined in claim 14, wherein the tube slide (33) has an upper edge which is chamfered (36) and which in the dump position lies on the lower edge of the bulk material hopper (7), and the outer truncated conical casing (39) and the inner truncated conical casing (41) protrude into the filler opening (73) of the container (72).

16. A loading system as defined in claim 14, wherein the operating pipe (34) is closed off with an end plate (43) to which a connector plate (45) of the inner truncated conical casing (41) is secured.

17. A loading system as defined in claim 14, wherein in a lower area of the inner truncated conical casing (41) there is at least one standoff strut (46) which in the dump position (54) and in the flushing position (55) of the loading system (92) lies on the closing flap (80) of the filler opening (73) so as to open the closing plate against the force of the spring (79).

18. A loading system as defined in claim 14, wherein the closing plate (80) is a truncated conical casing that tapers upward and has an upper cover with a casing surface which is inclined in a common direction to a casing surface of the inner truncated conical casing (41) on the operating pipe (34).

19. A loading system as defined in claim 8, wherein a seal (9) for the tube slide (33) is provided within the lower connecting flange (8).

20. A loading system as defined i claim 8, wherein an air vent pipe (24) is connected to the flushing chamber (21).

21. A loading system as defined in claim 1, wherein an upper area of the inner casing (14) of the double-walled dump pipe (3) is closed by a roof-shaped cover (15) so as to be dust-proof.

22. A loading system as defined in claim 21, wherein the roof-shaped cover (15) has a roof edge which lies in or below a plane of connection of an upper connecting flange (5) on the double-walled dump pipe (3).

23. A loading system as defined in claim 1, wherein the filler opening (73) of the container (72) has an edge which is provided with a reinforcing ring (74) on which, by means of distance beams (78) that protrude into the container (72), a spring seat (77) is provided to accommodate the spring (79) for the closing plate (80), which spring (79) is a coil spring.

24. A loading system as defined in claim 23, wherein the reinforcing ring (74) is combined with an L-cross section insert (75) on the inner ring of which there is a bevel for an annular seal (81) on a lower edge of the closing plate (80).

* * * * *